(12) United States Patent
Yaojun et al.

(10) Patent No.: US 9,170,609 B2
(45) Date of Patent: Oct. 27, 2015

(54) EXTENSION APPARATUS AND EXTENSION SYSTEM

(71) Applicant: KABUSHIKI KAISHA TOSHIBA, Minato-ku, Tokyo (JP)

(72) Inventors: Shi Yaojun, Hanzhong (CN); Zhou Anwei, Hanzhong (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 305 days.

(21) Appl. No.: 13/925,436

(22) Filed: Jun. 24, 2013

(65) Prior Publication Data

US 2014/0376173 A1 Dec. 25, 2014

(51) Int. Cl.
*G06F 1/16* (2006.01)

(52) U.S. Cl.
CPC .................... *G06F 1/1632* (2013.01)

(58) Field of Classification Search
CPC ................................... G06F 1/1632
USPC ................................... 361/679.41
See application file for complete search history.

(56) References Cited

U.S. PATENT DOCUMENTS

| | | | | |
|---|---|---|---|---|
| 6,093,039 | A * | 7/2000 | Lord | 439/155 |
| 6,119,184 | A * | 9/2000 | Takahama | 710/303 |
| 7,038,908 | B2 | 5/2006 | Usui et al. | |
| 2004/0145864 | A1 | 7/2004 | Usui et al. | |
| 2007/0070598 | A1 * | 3/2007 | Chuang | 361/686 |
| 2010/0265652 | A1 * | 10/2010 | Agata et al. | 361/679.41 |
| 2012/0250246 | A1 * | 10/2012 | Nakajima | 361/679.41 |
| 2013/0107446 | A1 * | 5/2013 | Carnevali | 361/679.43 |

FOREIGN PATENT DOCUMENTS

| | | |
|---|---|---|
| JP | 10-126067 A | 5/1998 |
| JP | 2002-006986 A | 1/2002 |
| JP | 2004-227166 A | 8/2004 |
| JP | 2010-250699 A | 11/2010 |

* cited by examiner

*Primary Examiner* — Anthony Q Edwards
(74) *Attorney, Agent, or Firm* — Knobbe, Martens, Olson & Bear LLP

(57) ABSTRACT

According to one embodiment, an extension apparatus includes, a housing, a hook portion, a switch portion, a mechanical portion which moves the hook portion between the engaged state and the disengaged state, a pin portion provided inside the switch portion, a first spring portion interposed between the housing and the pin portion, an abutting portion provided in the mechanical portion, abutting a distal end of the pin portion, and releasing abutment when the pushing amount of the switch portion exceeds a predetermined amount, and a second spring portion striking the distal end of the pin portion against a sound-producing portion when abutment of the distal end of the pin portion is released.

10 Claims, 16 Drawing Sheets

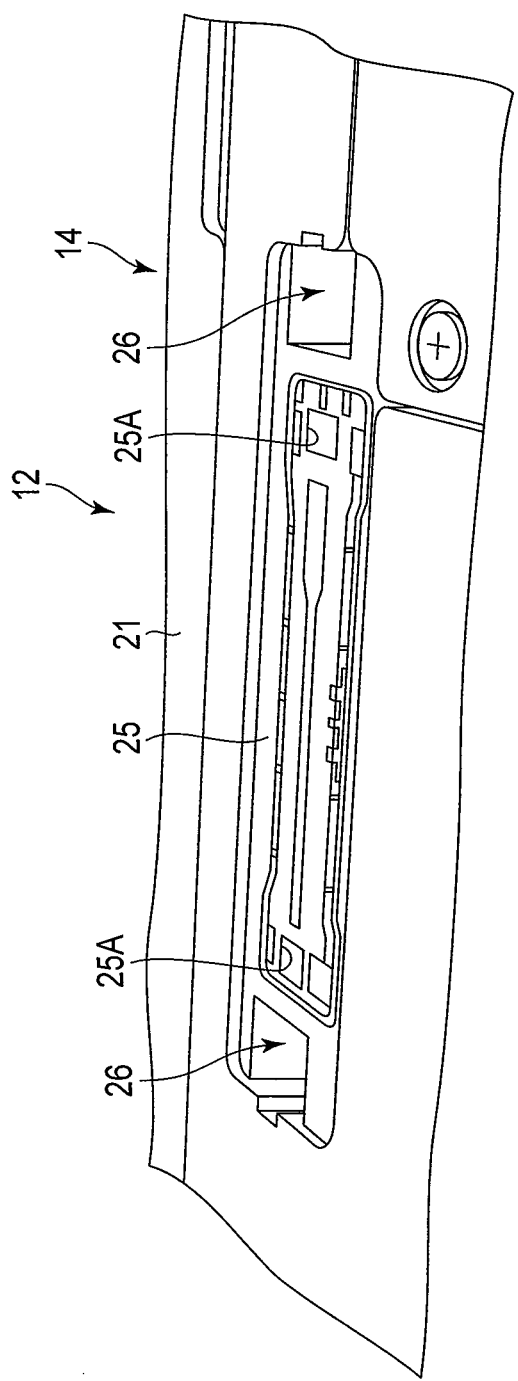
F I G. 3

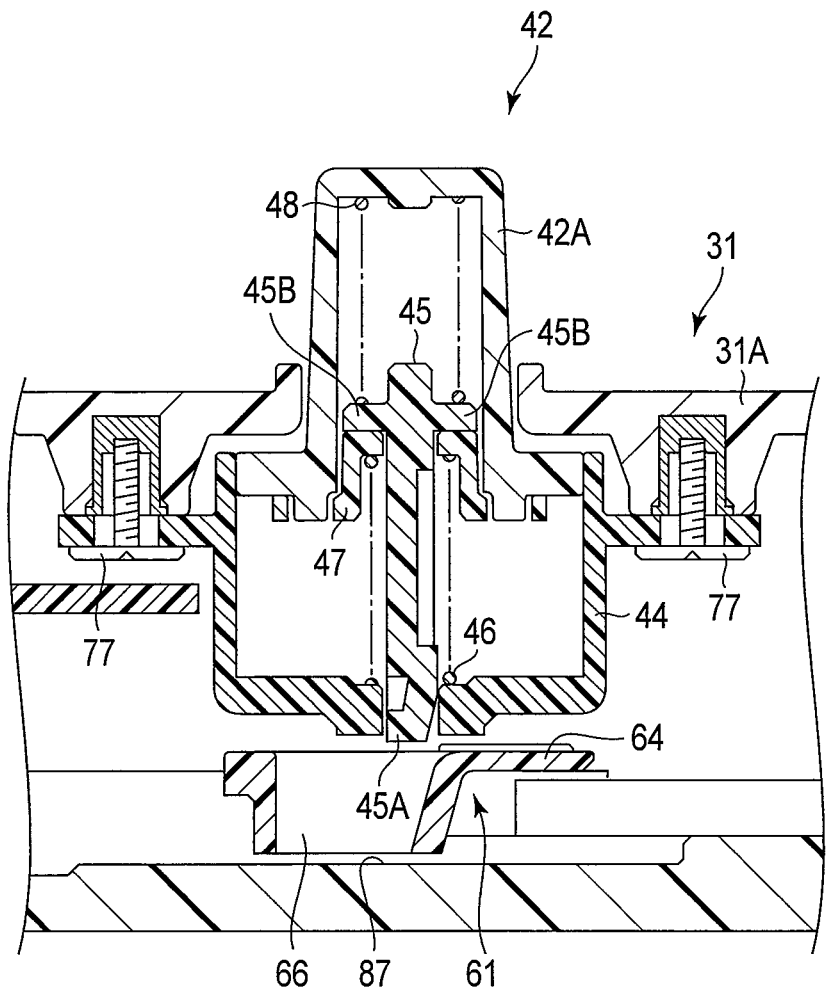
F I G. 6

EXTENSION APPARATUS AND EXTENSION SYSTEM

FIELD

Embodiments described herein relate generally to an extension apparatus and an extension system, which can be connected to a main body unit.

BACKGROUND

There are portable information processing apparatuses, which can be connected to a function extension apparatus. There are demands for extending functions of information processing apparatuses of this type, to improve their communication performances at home or in the office, and establish electrical connection with another electronic apparatus. Thus, there are technical needs for improvement of function extension apparatuses configured to provide extended functions.

The object of the present invention is to provide an extension apparatus and an extension system with improved reliability.

BRIEF DESCRIPTION OF THE DRAWINGS

FIG. 3 is an exemplary enlarged perspective view of a part, including a second connector portion, of a main body unit illustrated in FIG. 1.

FIG. 6 is an exemplary cross-sectional view of the extension apparatus illustrated in FIG. 6, the view taken along line F6-F6.

DETAILED DESCRIPTION

Various embodiments will be described hereinafter with reference to the accompanying drawings.

In general, according to one embodiment, an extension apparatus comprises: a housing: a hook portion movable between an engaged state of being engaged with a main body unit and a disengaged state of being disengaged from the main body unit; a switch portion capable of advancing and retreating with respect to the housing, and being pushed into the housing when the main body unit is attached; a mechanical portion which moves the hook portion between the engaged state and the disengaged state, in response to pushing of the switch portion; a pin portion provided inside the switch portion; a first spring portion interposed between the housing and the pin portion; an abutting portion provided in the mechanical portion, the abutting portion being movable in a direction crossing advancing and retreating directions of the switch portion in connection with a pushing amount of the switch portion, abutting a distal end of the pin portion, and releasing abutment against the distal end of the pin portion when the pushing amount of the switch portion exceeds a predetermined amount; and a second spring portion interposed between an internal surface of the switch portion and the pin portion, the second spring portion striking the distal end of the pin portion against a sound-producing portion when abutment of the distal end of the pin portion against the abutting portion is released.

An embodiment of the extension system will be explained hereinafter with reference to FIG. 1 to FIG. 17. In the present specification, the front side (that is, the user side) is defined as front direction F, the back side as viewed from the user is defined as back direction B, the left side as viewed from the user is defined as left direction L, the right side as viewed from the user is defined as right direction R, an upward direction as viewed from the user is defined as upward direction U, and the downward direction as viewed from the user is defined as downward direction D.

Figure 1:
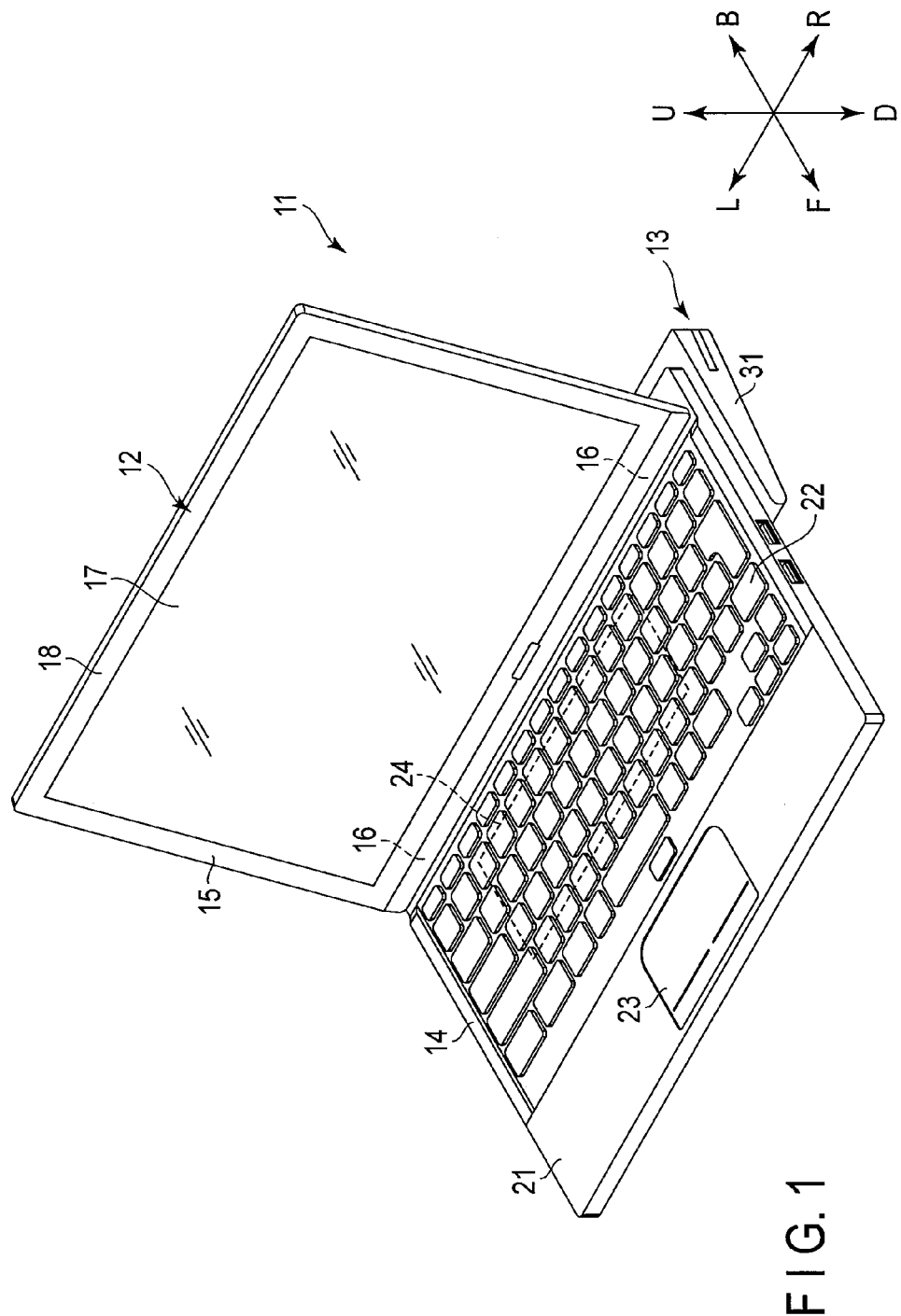
FIG. 1 is an exemplary perspective view of an extension system according to an embodiment.

As illustrated in FIG. 1, the extension system 11 comprises a main body unit 12 formed of an electronic apparatus such as a portable computer, and an extension apparatus 13 (docking apparatus, docker) connected to the main body unit 12.

The main body unit 12 includes an operation module 14, a display module 15, and a hinge module 16 provided between the operation module 14 and the display module 15. The hinge module 16 turnably supports the display module 15 with respect to the operation module 14.

The display module 15 includes a display panel 17, and a display case 18 surrounding the periphery of the display panel 17. Although the display panel 17 is formed of a liquid crystal display panel in the present embodiment, the display panel 17 may be a display panel of another type, such as a plasma display panel, an organic EL, a plastic display panel, and a sheet display panel.

As illustrated in FIG. 1 and FIG. 3, the operation module 14 is formed of a case 21 formed of synthetic resin material and having a box shape, a keyboard 22 provided on an upper surface (top wall) of the case 21, a touch pad 23 provided on the upper surface of the case 21, a printed circuit board 24 (mother board, main board) contained in the case 21, a second connector portion 25 which is fixed onto the printed circuit board 24, exposed to the outside at a position in a bottom surface of the case 21, and connected to a first connector portion 35 of the extension apparatus 13, and engaging hole portions 26 provided in the lower surface of the case 21 and engaged with hook portions 41 of the extension apparatus 13.

Guides 36 provided on the extension apparatus 13 are inserted into the respective engaging hole portions 26 prior to the hook portions 41. As illustrated in FIG. 3, the second connector portion 25 has a pair of square opening portions 25A. The opening portions 25A receive respective connector guides 37 provided on the first connector portion 35, and position the second connector portion 25 with respect to the first connection portion 35.

As illustrated in FIG. 2, FIG. 4, FIG. 5, and FIG. 6, the extension apparatus 13 includes a housing 31 provided with a first opening portion 32 and second opening portions 33, a board 34 (printed circuit board) provided inside the housing 31, the first connector portion 35 provided on the board 34 and exposed to the outside of the housing 31 through the first opening portion 32, a pair of guides 36 united with the housing 31 and provided in the vicinity of the respective second opening portions 33, connector guides 37 provided on the first connector portion 35, the hook portions 41 running through the second opening portions 33 and extending over the inside of the housing 31 and the outside of the housing 31, a switch portion 42 to sense that the main body unit 12 has been connected, a mechanical portion 43 which moves the hook portions 41 in response to pushing of the switch portion 42, a switch cover 44 which is fixed to a main body portion 31A of the housing 31 and forms part of the housing 31, a pin portion 45 provided inside the switch portion 42, a first spring portion 46 interposed between the housing 31 (switch cover 44) and the pin portion 45, a pin cover 47 interposed between the pin portion 45 and the first spring portion 46, a second spring portion 48 interposed between an internal surface of the switch portion 42 and the pin portion 45 and urging the pin portion 45 in a direction of going away from the internal surface of the switch portion 42, and connection pins 51 for ground connection.

Figure 2:
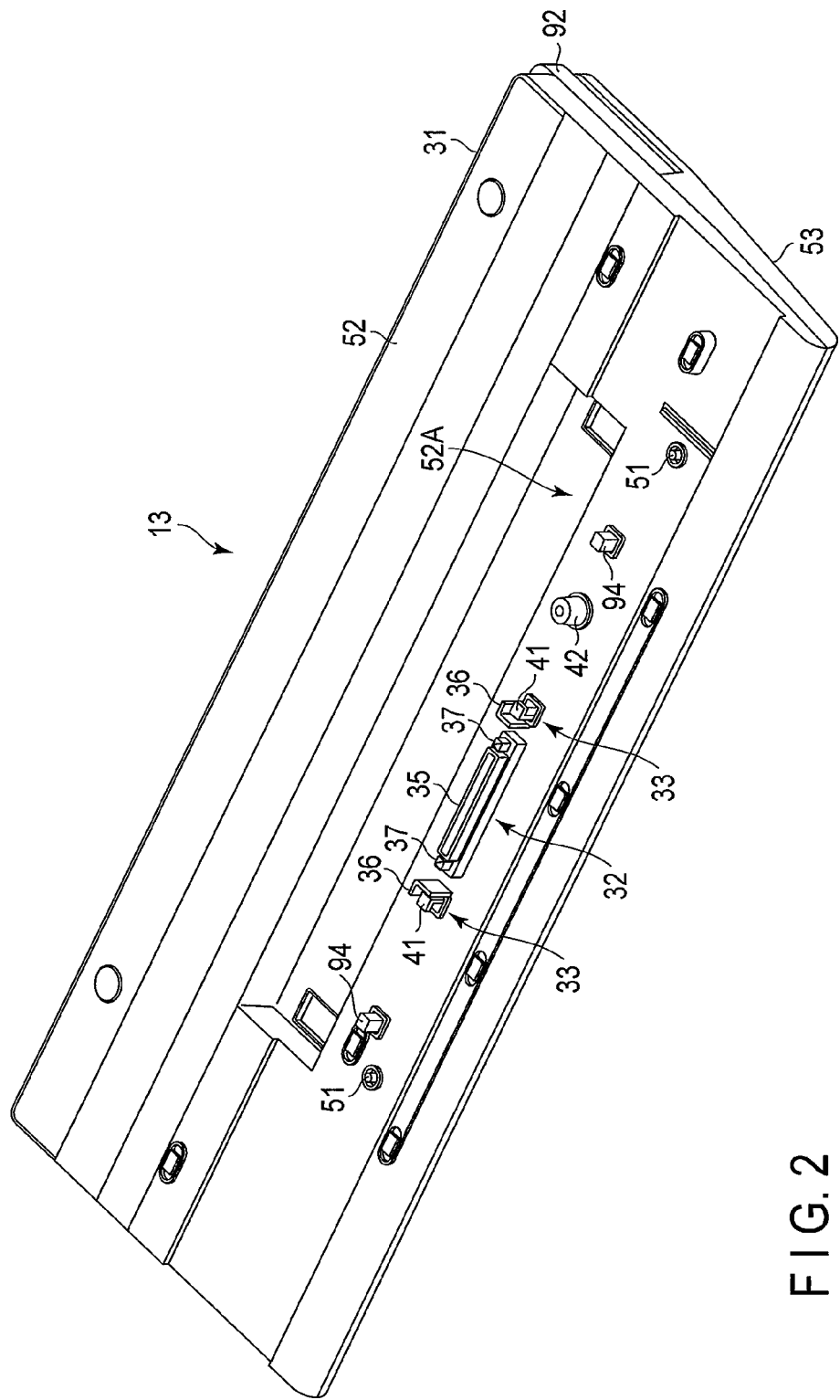
FIG. 2 is an exemplary perspective view of an extension apparatus of the extension system illustrated in FIG. 1.

As illustrated in FIG. 2, the housing 31 is formed of, for example, a synthetic resin material, and has a box shape inclined in a depth direction such that a height of the housing 31 gradually increases from the front to the back. The housing 31 includes an upper case 52 and a lower case 53. The upper case 52 includes a depressed portion 52A. The inside of the depressed portion 52A can receive a bulge portion of the main body unit 12, which bulges and corresponds to a battery portion. The connection pins 51 are electrically connected to a conductive metal thin film (electromagnetic-wave shield layer) provided on an internal surface of the housing 31. The connection pins 51 can be electrically connected with a conductive metal thin film (electromagnetic-wave shield layer) provided on an internal surface of the main body unit 12, via a conductor portion (not shown) of the main body unit 12.

Figure 4:
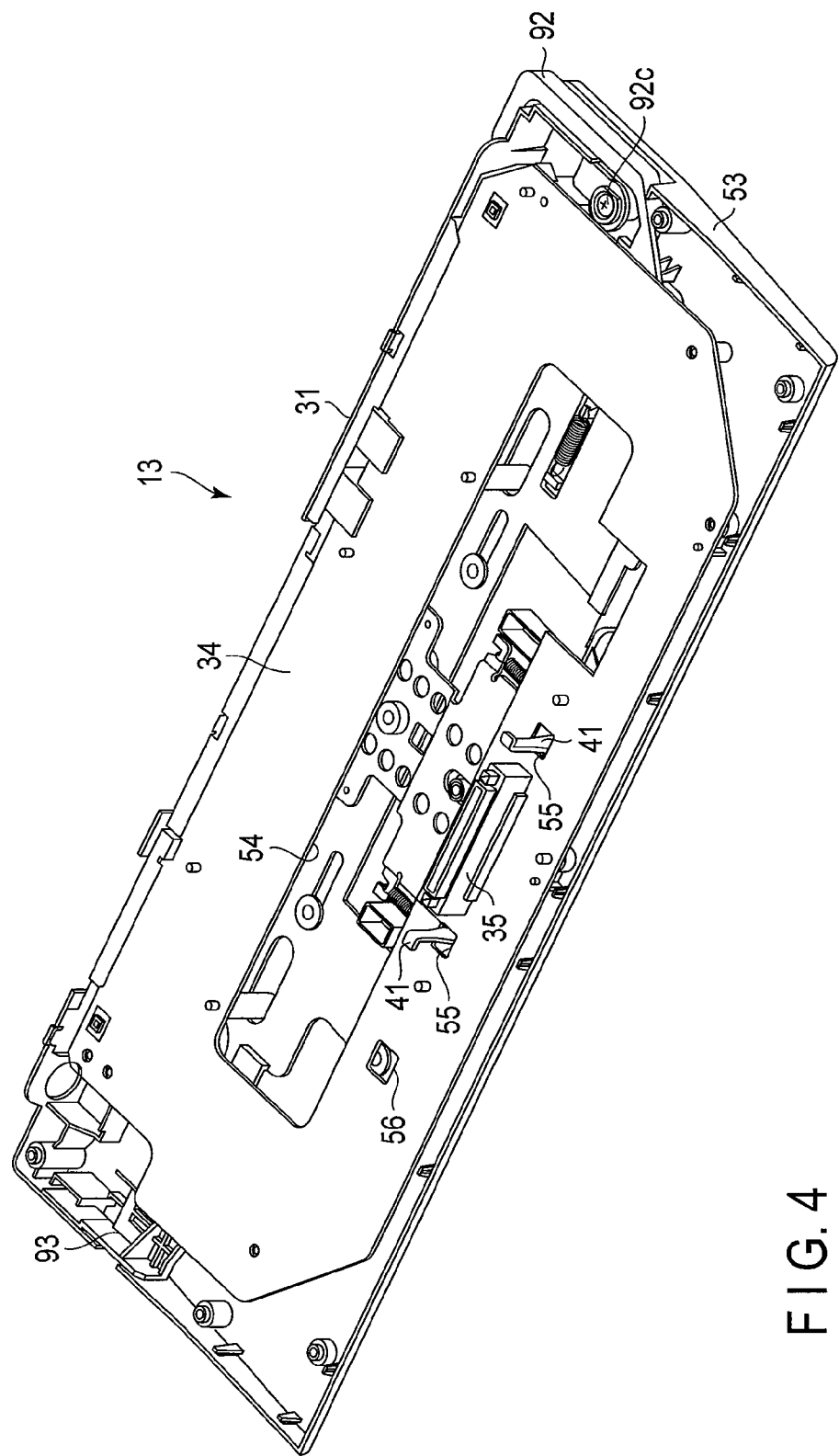
FIG. 4 is an exemplary perspective view illustrating a state in which an upper case of a housing of the extension apparatus illustrated in FIG. 2 is detached.

As illustrated in FIG. 4, the board 34 includes a first through-hole portion 54 provided in a center part of the board 34, second through-hole portions 55 provided in the vicinity of the first connector portion 35, and a third through-hole portion 56 provided in a position corresponding to a push-pin 94. The hook portions 41 extend through the respective second through-hole portions 55. The push-pin 94 extends through the third through-hole portion 56.

As illustrated in FIG. 2, each of the guides 36 is L-shaped, and covers part of the periphery of the corresponding hook portion 41. Each of the guides 36 is provided along an outer edge of the corresponding second opening portion 33. Each guide 36 projects from a surface of the housing 31 to be higher than the height of the hook portion 41, and prevents a distal end of the hook portion 41 from being broken. Each of the connector guides 37 is formed to have a prism shape, and configured to be capable of being inserted into the opening portion 25A of the second connector portion 25.

Figure 8:
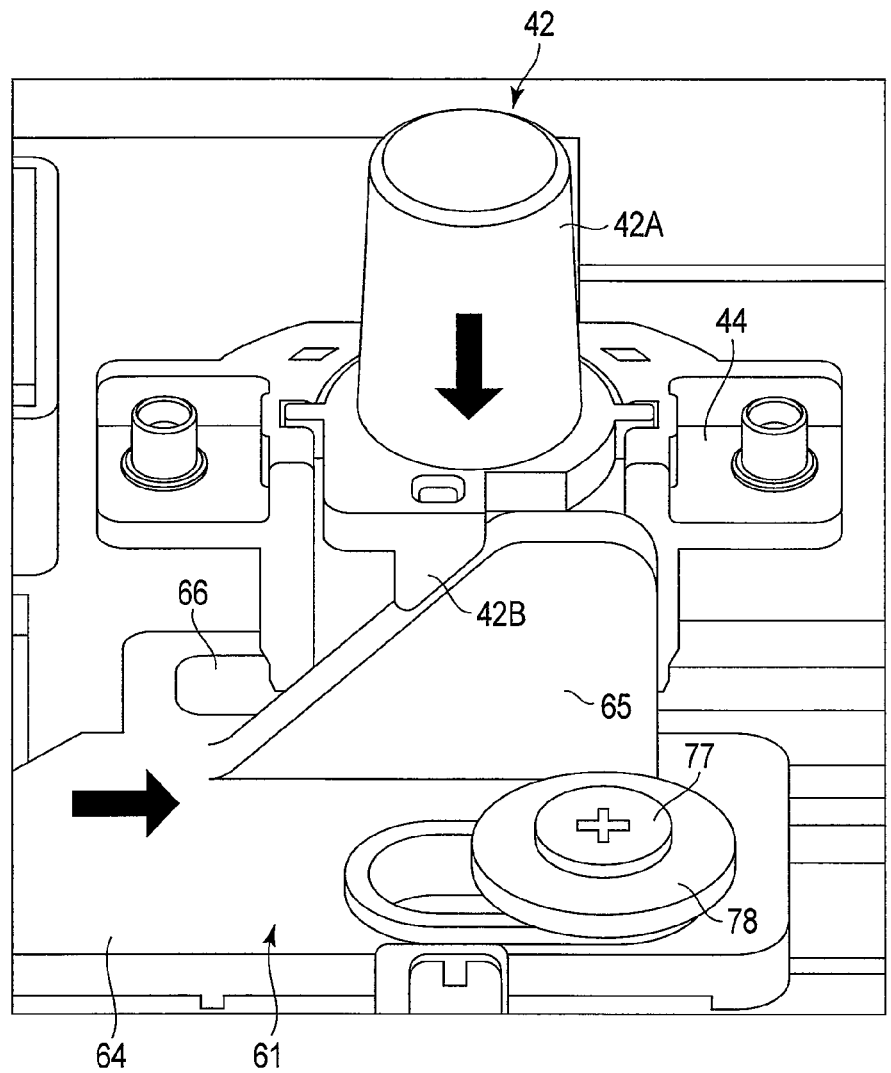
FIG. 8 is an exemplary enlarged perspective view of a part, including a switch portion, of the extension apparatus illustrated in FIG. 5.

As illustrated in FIG. 2, FIG. 6, and FIG. 8, the switch portion 42 is configured to be capable of advancing and retreating with respect to the housing 31. The switch portion 42 is configured to be pushed into the housing 31 when the main body unit 12 is attached. The switch portion 42 is formed of, for example, a synthetic resin material. The switch portion 42 includes a button portion 42A which has a generally cylindrical shape, and a slide piece 42B which has a generally triangular shape and projects from the button portion 42A toward a link rod 61.

Figure 5:
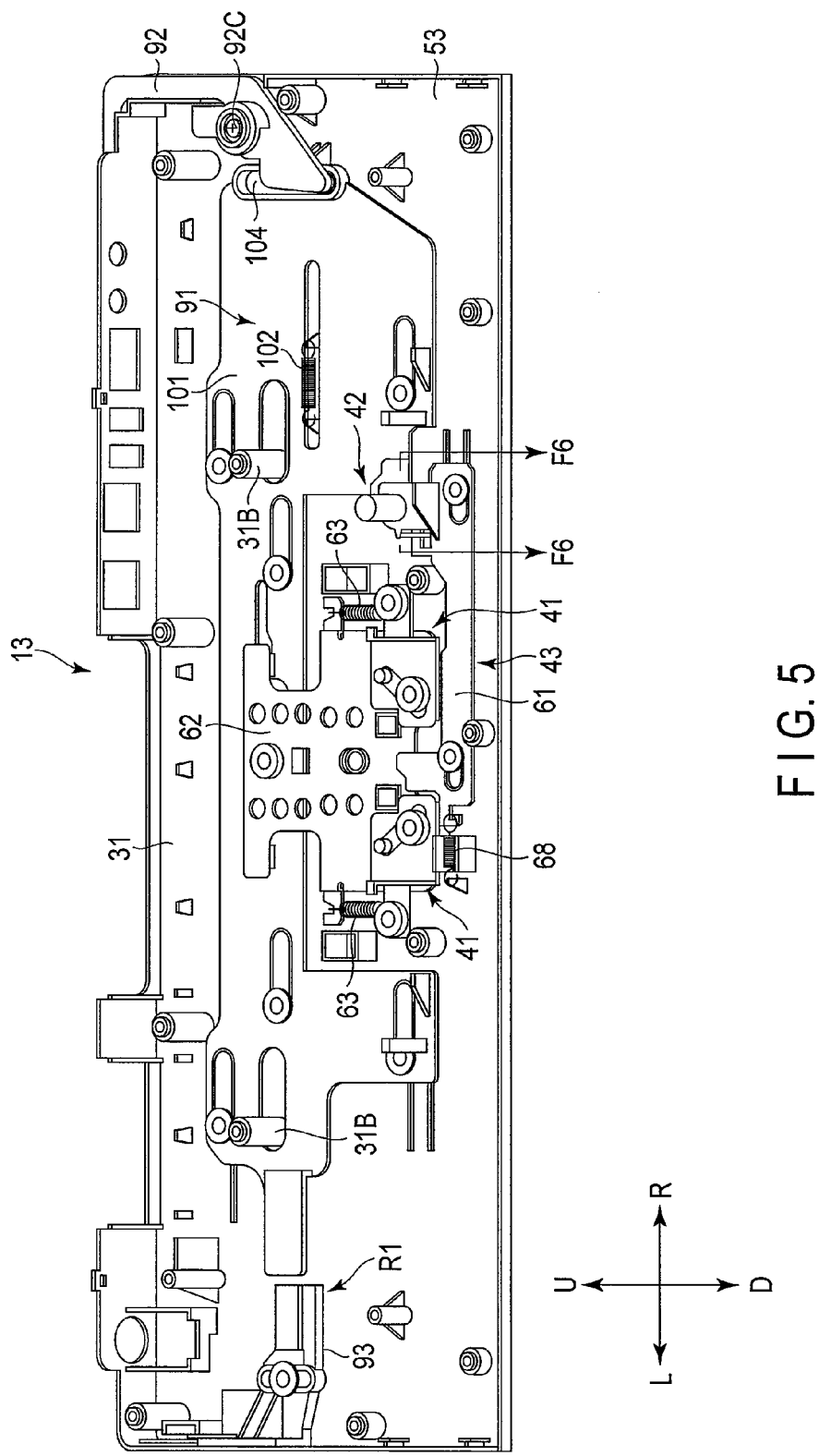
FIG. 5 is an exemplary perspective view illustrating a state in which a board is detached from the extension apparatus illustrated in FIG. 4.

The mechanical portion 42 is capable of moving the hook portions 41 between an engaged state S1 and a disengaged state S2, in response to pushing of the switch portion 42. As illustrated in FIG. 5, the mechanical portion 43 includes a link rod 61 which has an elongated plate shape and abutting against the slide piece 42B of the switch portion 42, a hook plate 62 provided adjacent to the link rod 61, and a pair of third spring portions 63 which urge the hook plate 62 toward the front direction.

Figure 7:
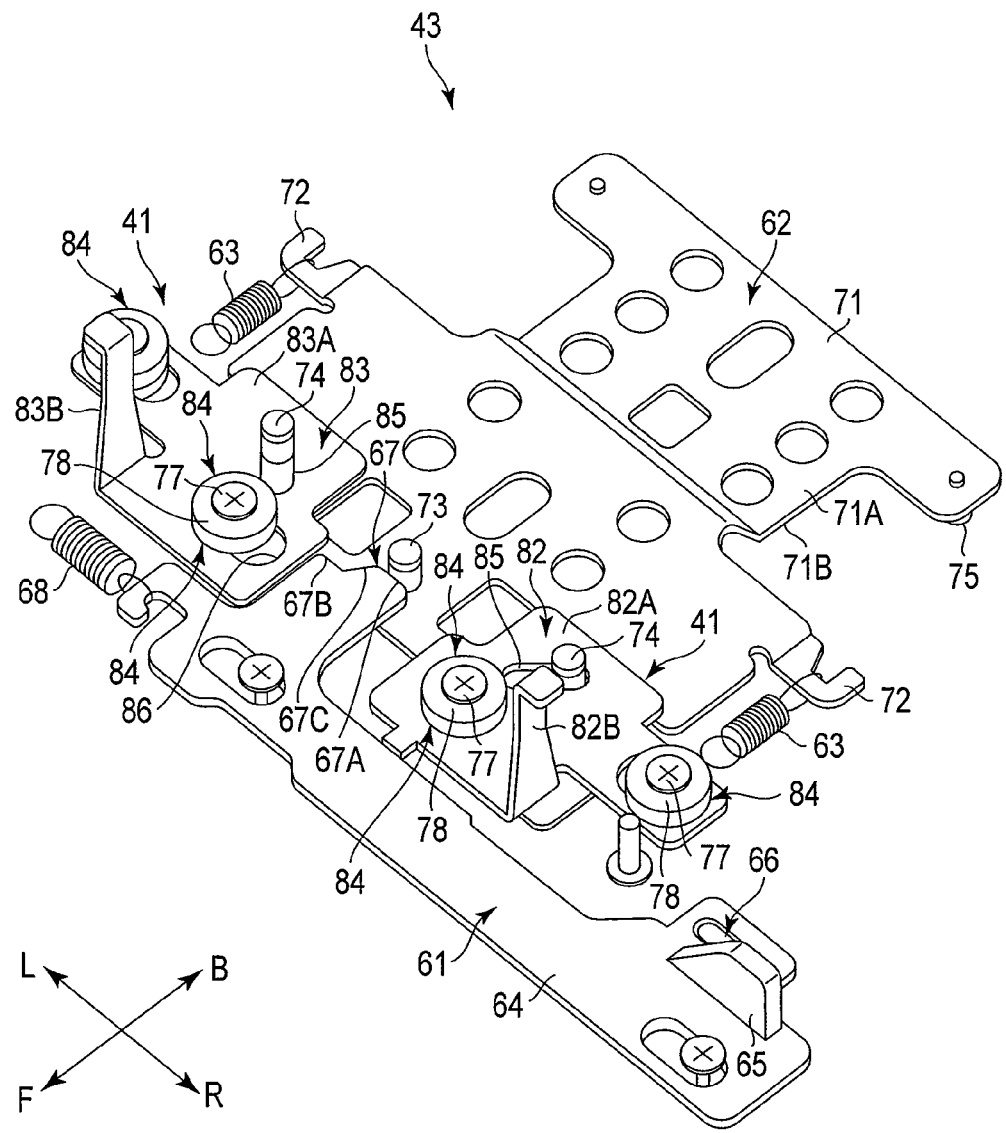
FIG. 7 is an exemplary enlarged perspective view of a mechanical portion of the extension apparatus illustrated in FIG. 5.

As illustrated in FIG. 7, the link rod 61 is movable in a direction (lateral direction) crossing the advancing and retreating directions of the switch portion 42, in connection with the pushing amount of the switch portion 42. The link rod 61 is always urged leftward by a fifth spring portion 68. The link rod 61 is formed of, for example, a metal material. The link rod 61 includes a base portion 64, a first cam portion 65 provided at one end of the base part 64 and including an inclined surface which contacts the slide piece 42B of the switch portion 42, a hole portion 66 provided in a position (in the vicinity of the first cam portion 65) adjacent to the first cam portion 65 of the base portion 64, and a second cam portion 67 provided at the other end of the base portion 64 and contacting a first pin 73 (described later) of the hook plate 62. The first cam portion 65 rises from the base portion 64 in a direction crossing (perpendicular to) the base portion 64. The hole portion 66 is formed to have, for example, an elliptic shape. A distal end 45A of the pin portion 45 is capable of being fitted into the hole portion 57, and going out of the hole portion 57 and abutting against the base portion 64 (FIG. 10 and FIG. 11).

Figure 10:
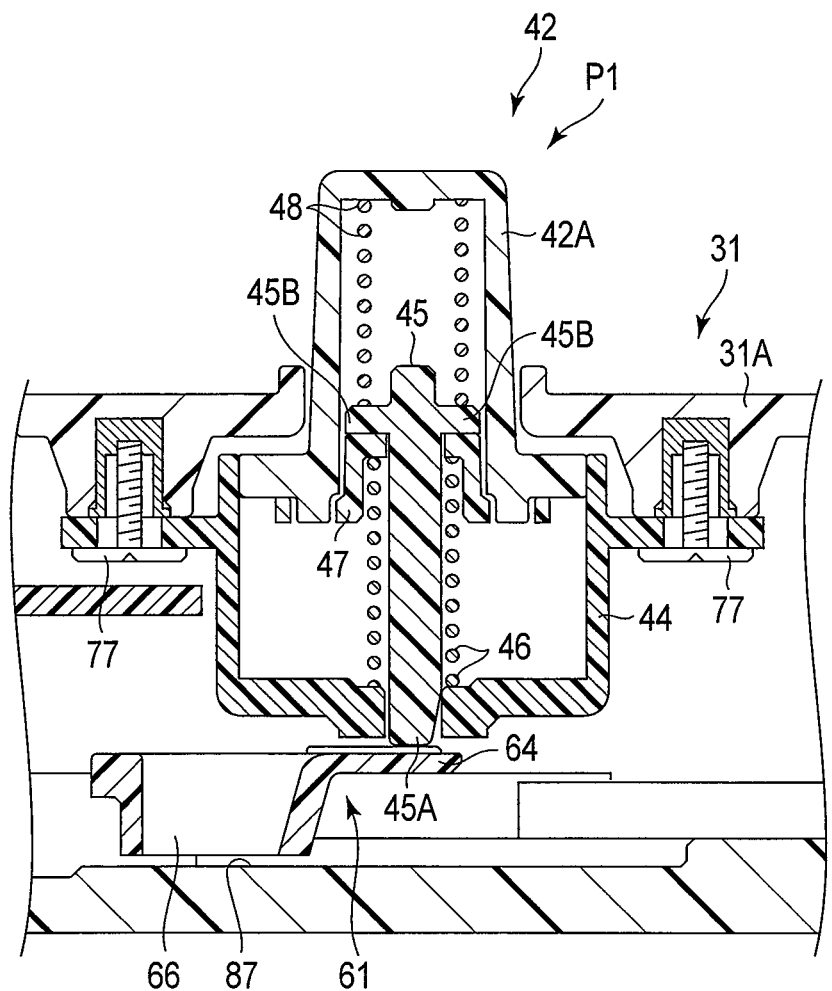
FIG. 10 is an exemplary cross-sectional view illustrating positional relationship around a pin portion, when hook portions are in a disengaged state in the extension apparatus illustrated in FIG. 6.
Figure 11:
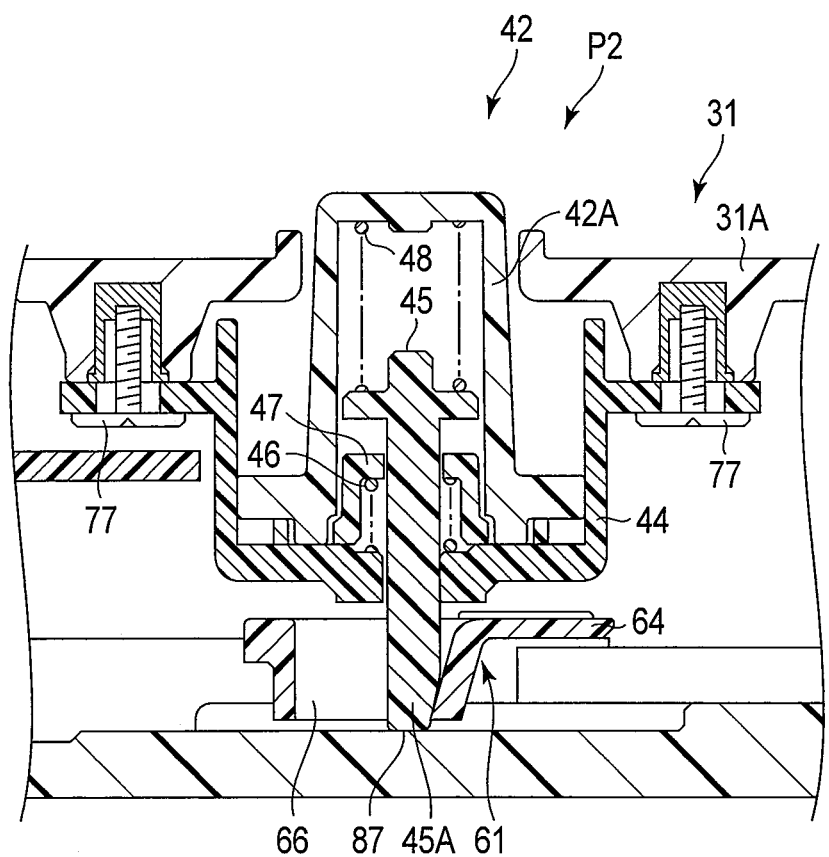
FIG. 11 is an exemplary cross-sectional view illustrating positional relationship around the pin portion, when the hook portions are in the engaged state in the extension apparatus illustrated in FIG. 5.

As illustrated in FIG. 10, when the pushing amount of the switch portion 42 is smaller than a predetermined amount, the distal end 45A of the pin portion 45 abuts against the link rod 61 (base portion 64). As illustrated in FIG. 11, when the pushing amount of the switch portion 42 exceeds the predetermined amount, the distal end 45A of the pin portion 45 is fitted into the hole portion 57 of the link rod 61. This releases abutment of the distal end 45A of the pin portion 45 against the link rod 61 (base portion 64). The link rod 61 is an example of an abutment portion.

Figure 9:
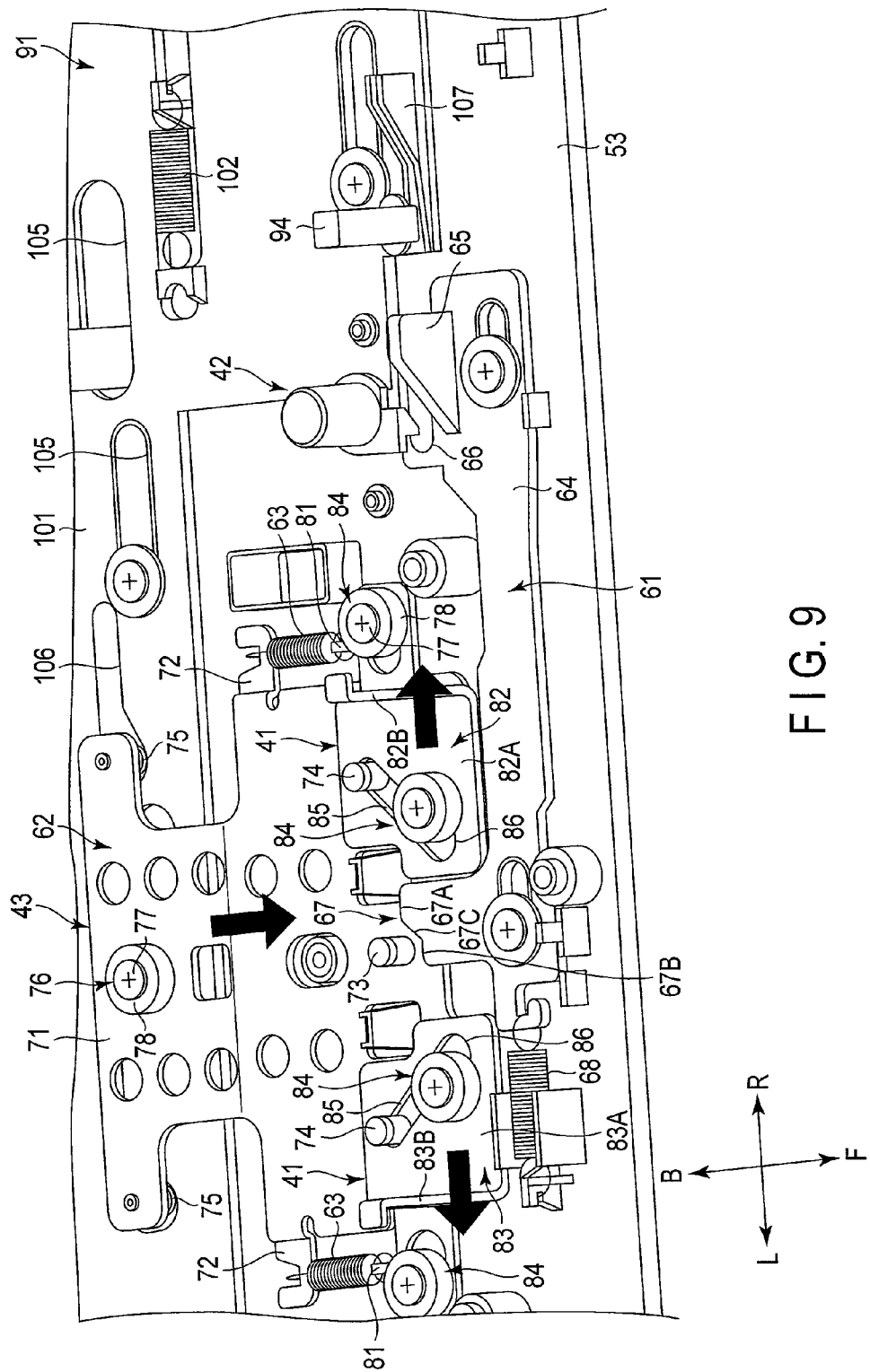
FIG. 9 is an exemplary enlarged perspective view of a part, including the mechanical portion, of the extension apparatus illustrated in FIG. 5.

As illustrated in FIG. 7 and FIG. 9, the second cam portion 67 includes a first portion 67A which abuts against a first pin 73 of the hook plate 62 when the hook portions 41 are in the disengaged state S2, a second portion 67B which abuts against the first pin 73 when the hook portions 41 are in the engaged state, and an inclined surface portion 67C connecting the first portion 67A with the second portion 67B.

As illustrated in FIG. 7 and FIG. 9, the hook plate 62 is formed of, for example, a metal material. The hook plate 62 includes a plate-like portion 71 having a generally flat plate shape, a pair of hook portions 72 provided on the plate-like portion 71 and on which the third spring portions 63 are hung, a first pin 73 which projects from one surface 71A of the plate-like portion 71 in a direction crossing the plate-like portion 71 and abutting against the second cam portion 67 of the link rod 61, two second pins 74 which project from the surface 71A of the plate-like portion 71 in the direction crossing the plate-like portion 71 and are inserted into long holes 85 of the respective hook portions 41, two third pins 75 which project from the other surface 71B of the plate-like portion 71 in the direction crossing the plate-like portion 71 and are inserted into cam holes 106 of a slider 101, and a first holder portion 76 which holds the plate-like portion 71 movably in the front and back directions with respect to the housing 31.

The first holder portion 76 includes a fixing member 77, such as a screw, which is fixed to the housing 31, and a buffer bush 78 interposed between the fixing member 77 and the plate-like portion 71. The bush 78 is formed of, for example, a rubber material or a synthetic resin material, and has a ring shape.

As illustrated in FIG. 9, each of the third spring portions 63 is hung between a boss portion 81 projecting from a bottom portion of the housing 31 and the hook portion 72 of the hook plate 62. Each of the third spring portions 63 is formed of an extension coil spring. The third spring portions 63 are an example of a preventing portion having a function of preventing the hook portions 41 from moving to the disengaged state S2.

Figure 14:
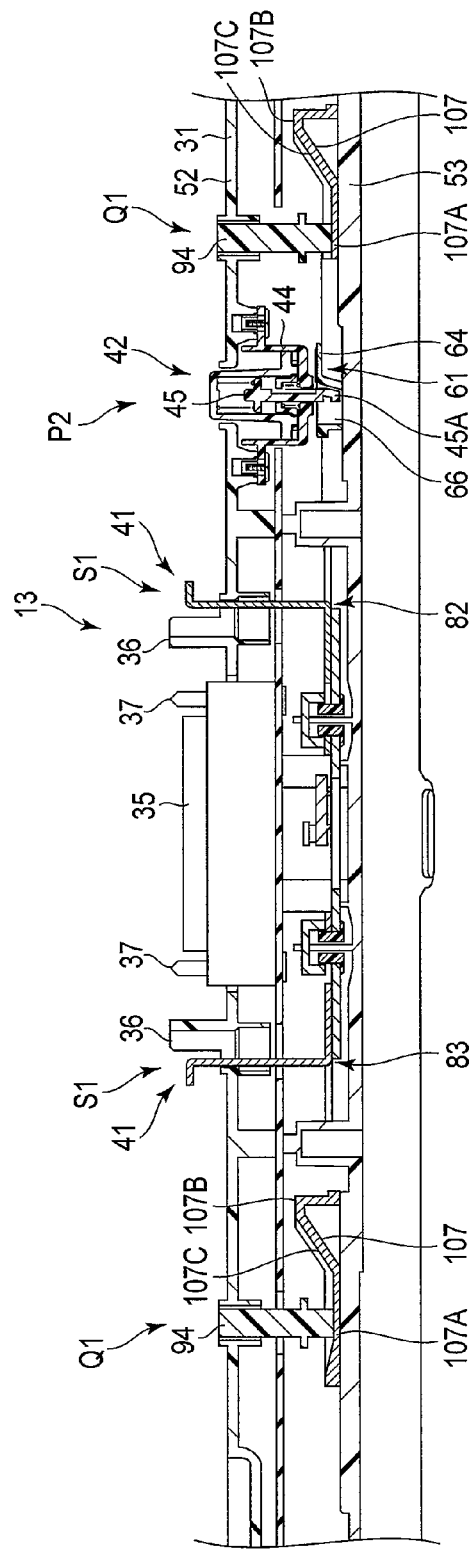
FIG. 14 is an exemplary cross-sectional view of the extension apparatus illustrated in FIG. 12, the view taken along line F14-F14 of FIG. 12.
Figure 15:
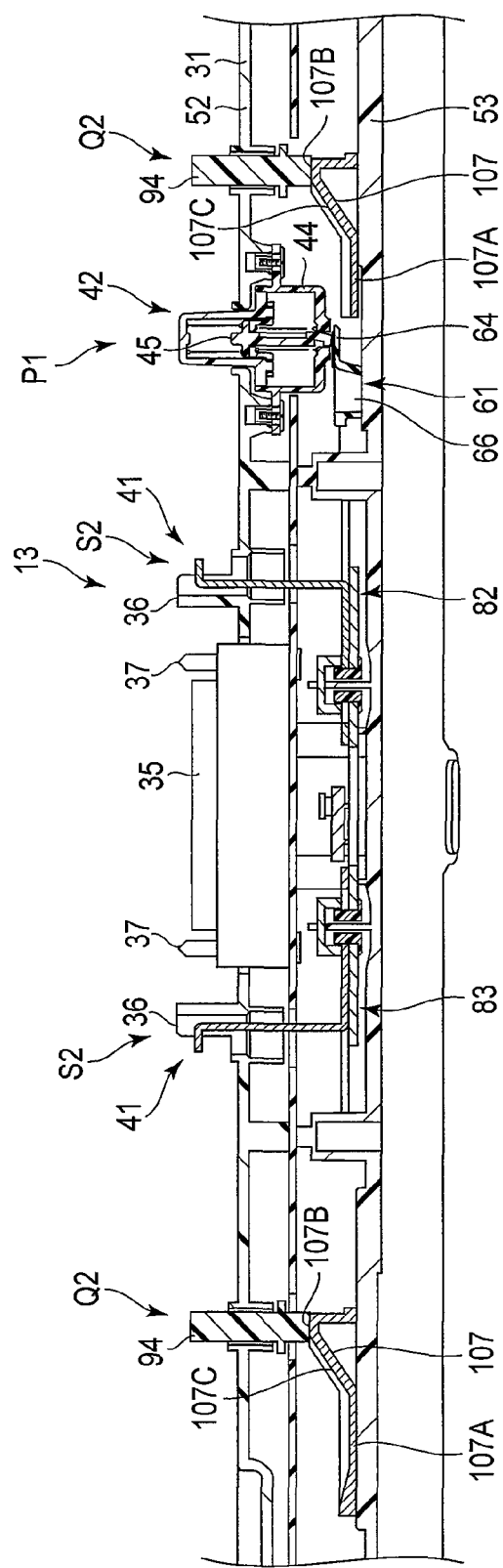
FIG. 15 is an exemplary cross-sectional view of the extension apparatus illustrated in FIG. 13, the view taken along line F15-F15 of FIG. 13.

The hook portions 41 are movable between the engaged state S1 in which they are engaged with the main body unit 12 and the disengaged state S2 in which they are disengaged from the main body unit 12 (FIG. 14 and FIG. 15). As illustrated in FIG. 7 and FIG. 9, the hook portions 41 include a right hook 82, and a left hook 83. Each of the right hook 82 and the left hook 83 is formed of a metal material. The right hook 82 includes a right bottom plate portion 82A, a right-hook main body 82B which rises from the right bottom plate portion 82A in a direction crossing the right bottom plate portion 82A, and a second holder portion 84 which slidably holds the right-hook main body 82B in the left and right directions. The right bottom plate portion 82A is provided with a long hole 85 (hole forming a cam surface), through which the second pin 74 of the hook plate 62 extends, and a through hole 86, through which the second holder portion 84 extends. A distal end portion of the right-hook main body 82B is bent to have a hook shape.

The left hook 83 is formed to be symmetrical with the right hook 82. The left hook 83 includes a left bottom plate portion 83A, a left-hook main body 83B rising from the left bottom plate portion 83A in a direction crossing the left bottom plate portion 83A, and a second holder portion 84 which slidably holds the left-hook main body 83B in the left and right direction. The left bottom plate portion 83A is provided with a long hole 85 (hole forming a cam surface), through which the second pin 74 of the hook plate 62 extends, and a through hole 86, through which the second holder portion 84 extends. A distal end portion of the left-hook main body 83B is bent to have a hook shape.

In the present embodiment, the hook portions 41 are capable of being engaged with the main body unit 12 in two directions. Thus, the hook portions 41 of the present embodiment have a structure in which the main body unit 12 hardly falls off, in comparison with a type of hook portions 41 which are engaged with the main body unit 12 in one direction.

Each of the second holder portions 84 includes a fixing member 77, such as a screw, which is fixed to the housing 31, and a buffer bush 78 interposed between the fixing member 77 and the right bottom plate portion 82A (left bottom plate portion 83A). Each bush 78 is formed of, for example, a rubber material or a synthetic resin material, and has a ring shape.

As illustrated in FIG. 6, the switch cover 44 is formed of, for example a synthetic resin material, and fixed to the main body portion 31A of the housing 31 by the fixing members 77, such as screws. The pin portion 45 is formed of, for example, a synthetic resin material, and has a rod shape including a brim portion 45B. The pin cover 47 is formed of, for example, a synthetic resin material, and has a hat-shaped cross section.

Each of the first spring portion 46 and the second spring portion 48 is formed of a compression coil spring. The second spring portion 48 has repulsive force larger than a repulsive force of the first spring portion 46. The second spring portion 48 urges the pin portion 45 in a direction of striking a distal end of the pin portion 45 against a sound-producing portion 87. The second spring portion 48 is capable of striking the distal end of the pin portion 45 against the sound-producing portion 87 with great force, when abutment between the distal end 45A of the pin portion 45 and the link rod 61 (base portion 64) is released. In the present embodiment, the sound-producing portion 87 is formed of part (wall portion) of the housing 31. The example of the sound-producing portion 87 is not limited to it, but a metal plate or the like may be adopted as the sound-producing portion 87.

As illustrated in FIG. 5 and FIG. 9, the extension apparatus 13 includes a release mechanism 91 which changes the hook portion 41 from the engaged state to the disengaged state, an operation lever 92 to operate the release mechanism 91, a lock bar 93 which disables operation of the release mechanism 91, and a push-pin 94 which separates the main body unit 12 from the extension apparatus 13 with the operation of the operation lever 92.

Figure 12:
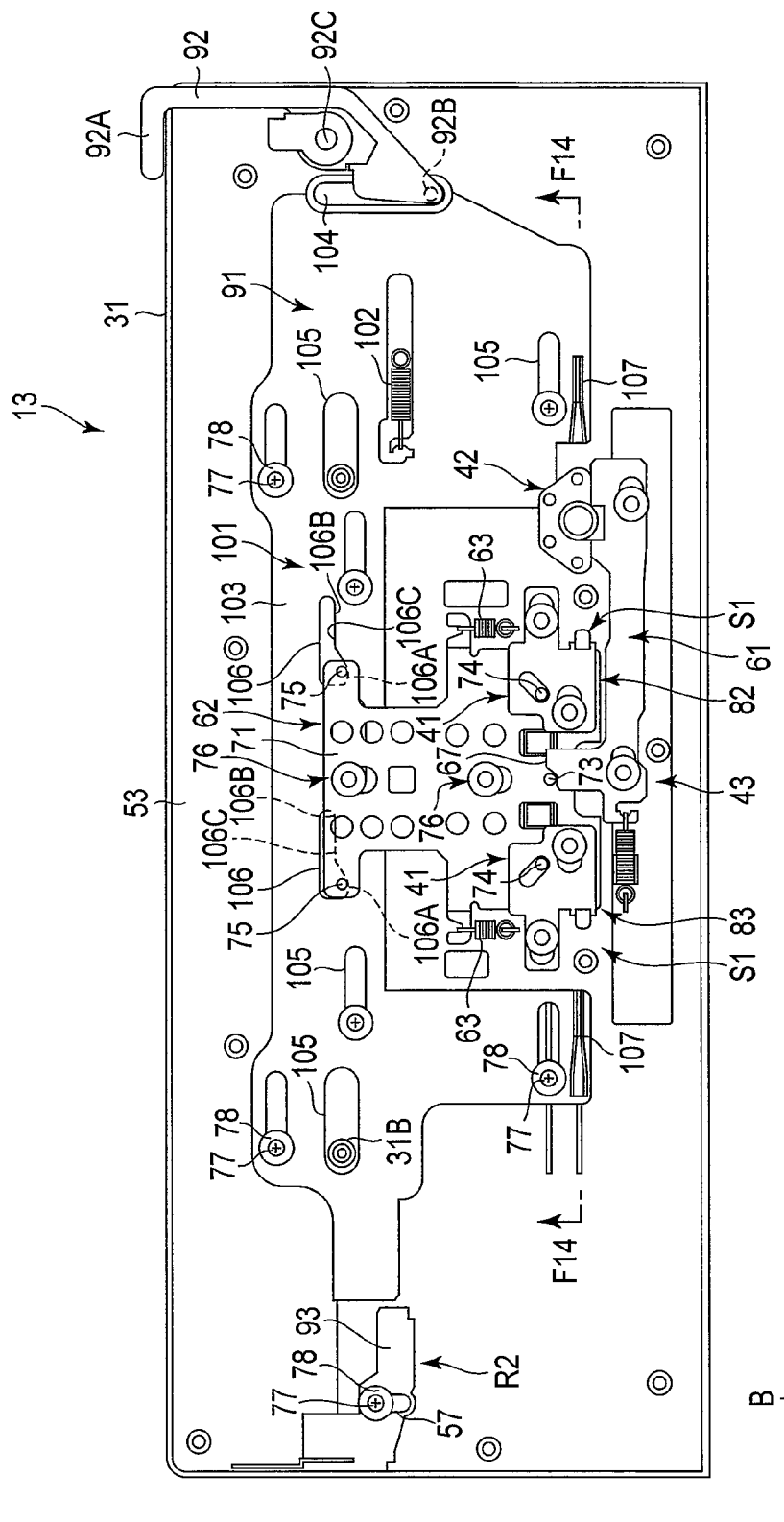
FIG. 12 is an exemplary top view of a whole structure of the extension apparatus illustrated in FIG. 5, in a state where the hook portions are in the engaged state.
Figure 13:
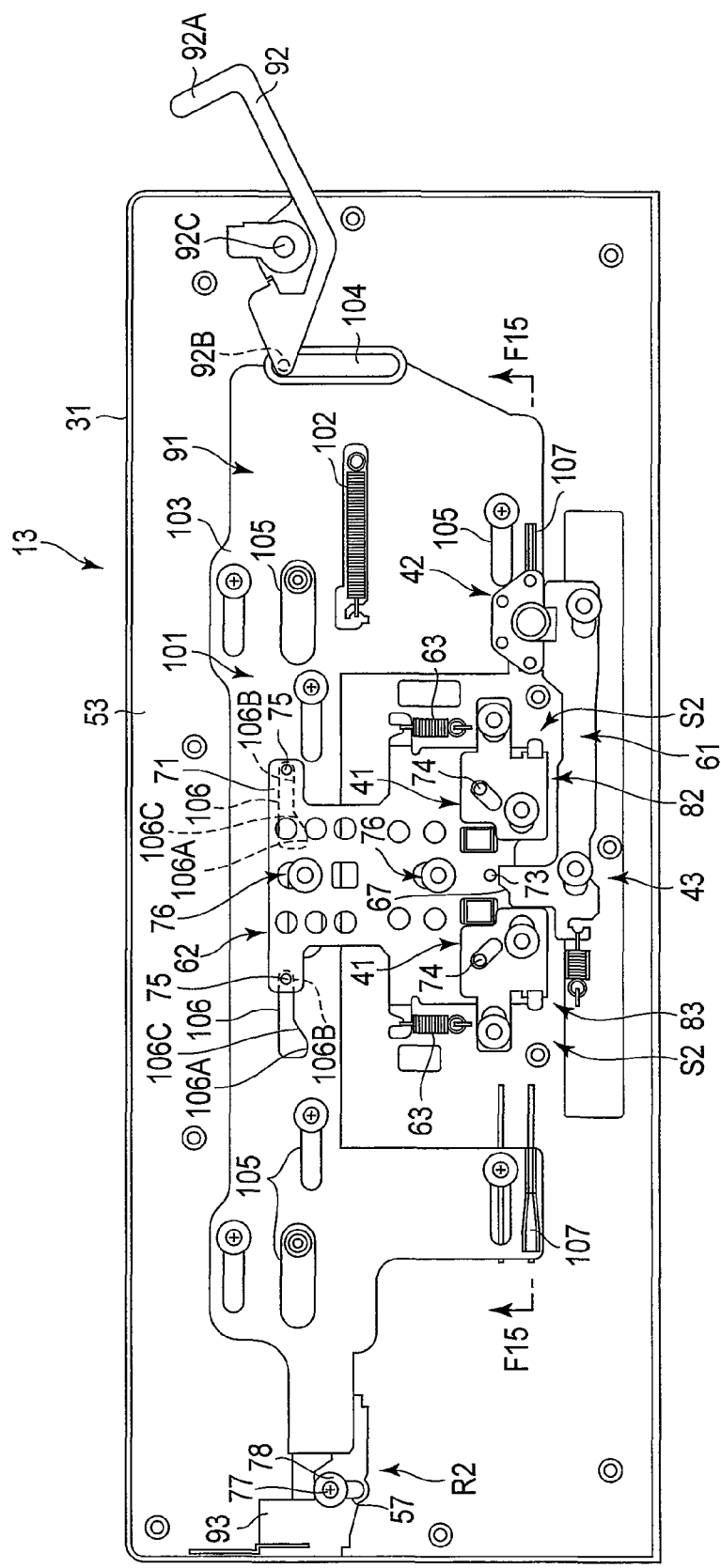
FIG. 13 is an exemplary top view of the whole structure of the extension apparatus illustrated in FIG. 5, in a state where an operation lever is operated.

The operation lever 92 is capable of turning around a shaft portion provided in the middle of the operation level 92 (FIG. 12 and FIG. 13). As illustrated in FIG. 12, the operation lever 92 has, at one end thereof, a fingerhold portion 92A which is bent to be L-shaped. The operation lever 92 includes, at the other end thereof, a pin 92B which is fitted into a cam groove 104 of the slider 101. The operation lever 92 is an example of an operating portion.

As illustrated in FIG. 5 and FIG. 12, the release mechanism 91 includes the slider 101 which is slidably provided in the left and right directions with respect to the bottom part of the housing 31, and a fourth spring portion 102 to urge the slider 101 in the right direction.

The slider 101 is formed of, for example, a metal material, and has a flat plate shape which is generally U-shaped as a whole. The slider 101 includes a flat plate portion 103, an elliptic cam groove 104 provided at one end (right end) of the flat plate portion 103 and extending in the front and back directions, a plurality of long holes 105 extending in the left and right directions, a cam hole 106, into which the third pin 75 of the hook plate 62 is fitted, and a cam projection 107 (FIG. 9) to push up the push-pin 94 to cause the push-pin 94 to project toward the outside of the housing 31.

As illustrated in FIG. 12, the bosses 31B projecting from the housing 31 extend through some long holes 105 among the long holes 105. The fixing members 77, such as screws, extend through the other long holes 105 among the long holes 105. A synthetic-resin bush 78 is interposed between the fixing member 77 and the long hole 105.

The cam hole 106 includes a first cam surface 106A which abuts against the third pin 75 of the hook plate 62 when the hook portions 41 are in the engaged state S1, a second cam surface 106B which abuts against the third pin 75 of the hook plate 62 when the hook portions 41 are in the disengaged state S2, and a connection surface 106C which connects the first cam surface 106A with the second cam surface 106B. The connection surface 106C includes a gentle inclined surface portion, such that the third pin 75 abutting against the first cam surface 106A can be guided to the second cam surface 106B smoothly when the user operates the operation lever 92. Specifically, the release mechanism 91 can receive the urging force of the third spring portion 63 (preventing portion) by the cam hole 106, and stop a function of the third spring portion 63, that is, a function of preventing the hook portions 41 from moving to the disengaged state S2.

The cam projection 107 is formed by subjecting the flat plate portion 103 to, for example, press working (drawing). As illustrated in FIG. 14, the cam projection 107 includes a first abutting portion 107a which abuts against the push-pin 94 when the hook portions 41 are in the engaged state S1, a second abutting portion 107B which abuts against the push-pin 94 when the hook portions 41 are in the disengaged state S2, and an inclined surface 107C which connects the first abutting portion 107A with the second abutting portion 107B.

The rocker bar 93 is an example of a disabling portion which disables operation of the release mechanism 91. As illustrated in FIG. 12, the rocker bar 93 has an elliptic hole portion 57 extending in the front and back directions. A fixing member 77, such as a screw, extends through the hole portion 57. A bush 78 formed of a synthetic resin material or the like is interposed between the fixing member 77 and an edge portion defining the periphery of the hole portion 57. The rocker bar 93 is movable in the front and back directions, and is slidable between a first state R1, in which the rocker bar 93 is positioned in a middle of a moving path of the release mechanism 91 (slider 101) and prevents the release mechanism 91 from moving, and a second state R2, in which the rocker bar 93 allows the release mechanism 91 to move.

The rocker bar 93 is provided with a fixing hole portion to fix a wire for preventing a theft, and the housing 31 is also provided with a like hole portion corresponding to the fixing hole portion. Fixing a wire to the fixing hole portion and the corresponding hole portion restricts movement of the rocker bar 93 between the first state R1 and the second state R2.

As illustrated in FIG. 2 and FIG. 14, each of the push-pins 94 is formed of, for example, a synthetic resin material, and has a square pillar shape. Each of the push-pins 94 can project to the outside of the housing 31, by running upon the second abutting portion 107 of the cam projection 107 of the slider 101 (FIG. 15). Each push-pin 94 is contained inside the housing 31, by moving onto the first abutting portion 107A of the cam projection 107 of the slider 101. The push-pins 94 are an example of a projecting portion which projects from the housing 31 and separates the main body unit 12 from the housing 31 when the release mechanism 91 is operated.

Next, an operation performed when the hook portions 41 of the extension apparatus 13 of the present embodiment is moved from the disengaged state S2 to the engaged state S1 will be explained hereinafter, with reference to FIG. 8 to FIG. 11, FIG. 16, and FIG. 17.

When the main body unit 12 is attached to the extension apparatus 13, the engaging hole portions 26 of the main body unit 12 are positioned to the guides 36 of the extension apparatus 13, such that the guides 36 are inserted into the engaging hole portions 26. Thereby, the position of the main body unit 12 is roughly determined with respect to the extension apparatus 13. Then, the connector guides 37 of the extension apparatus 13 are inserted into the opening portions 25A of the second connector portion 25, and the position of the main body unit 12 is further strictly determined with respect to the extension apparatus 13. Thereby, the first connector portion 35 of the extension apparatus 13 is connected to the second connector portion 25 of the main body unit 12.

Simultaneously with connection of the first connector portion 35 to the second connector portion 25 as described above, the switch portion 42 of the extension apparatus 13 is pushed into the housing 31 in an internal direction of the housing 31 by the bottom portion of the main body unit 12. In this operation, as illustrated in FIG. 8, the slide piece 42B of the switch portion 42 abuts against the first cam portion 65 of the link rod 61. Thereby, the link rod 61 slides in the right direction together with pushing down of the switch portion 42. In this operation, the hook plate 62 is always urged in the front direction by the third spring portions 63.

Thus, as illustrated in FIG. 9, the first pin 73 of the hook plate 62, which has abutted against the first portion 67A of the second cam portion 67 of the link rod 61 moves along the inclined surface portion 67C of the second cam portion 67, together with movement of the link rod 61, and moves to the second portion 67B of the second cam portion 67. Thereby, the hook plate 62 moves in the front direction as a whole. Together with this movement, the right hook 82 of the hook portions 41 moves in the right direction by the action of the second pin 74 of the hook plate 62 and the long hole 85 of the right hook 82. In the same manner, the left hook 83 of the hook portion 41 moves in the left direction by the action of the second pin 74 of the hook plate 62 and the long hole 85 of the left hook 83. As described above, the right hook 82 and the left hook 83 move from the disengaged state S2 to the engaged state S1.

As illustrated in FIG. 10, when the switch portion 42 is pushed into the housing 31 by the bottom portion of the main body unit 12, the distal end 45A of the pin portion 45 abuts against the link rod 61 (base portion 64) before the pushing amount (operation amount) of the switch portion 42 reaches the predetermined amount. As illustrated in FIG. 11, when the pushing amount (operation amount) of the switch portion 42 exceeds the predetermined amount, the distal end 45A of the pin portion 45 is inserted into the hole portion 57 of the link rod 61 with great force, by the urging force of the second spring portion 48. Thereby, the distal end 45A of the pin portion 45 is struck against part (sound-producing portion 87) of the housing 31 with great force, and a loud sound is produced. By the sound, the user can recognize that the main body unit 12 has been correctly connected to the extension apparatus.

As described above, the switch portion 42 is capable of moving between the first position P1 illustrated in FIG. 10 and the second position P2 illustrated in FIG. 11. Thus, even when the user who uses the main body unit 12 changes the distance between the main body unit 12 and the extension apparatus 13, the switch portion 12 can be caused to follow the position of the main body unit 12, mainly by the action of the first spring portion 46. In the same manner, the distance between the extension apparatus 13 and the main body unit 12 varies according to the size and type of the main body unit 12 attached to the extension apparatus 13, as illustrated in FIG. 16 and FIG. 17.

Figure 16:
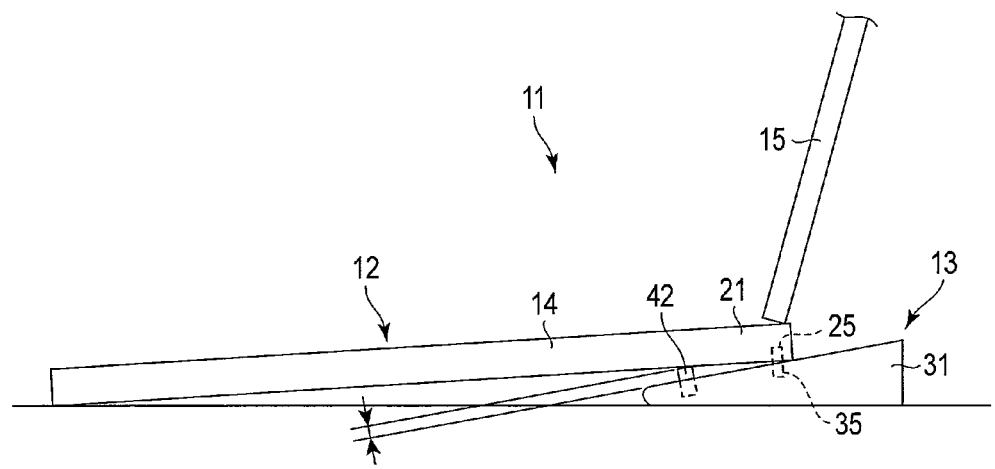
FIG. 16 is an exemplary side view of the extension system of the present embodiment, in a state where a comparatively large main body unit is attached to the extension apparatus.
Figure 17:
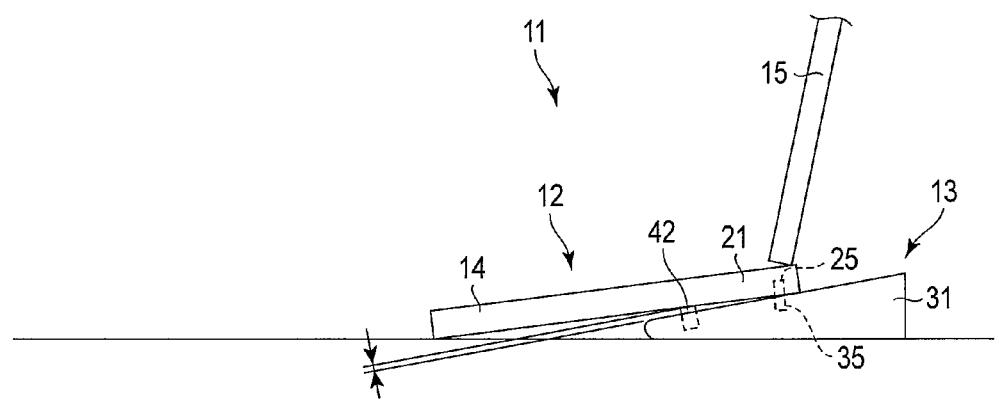
FIG. 17 is an exemplary side view of the extension system of the present embodiment, in a state where a comparatively small main body unit is attached to the extension apparatus.

According to the structure of the switch portion 42 of the present embodiment, even when the distance between the extension apparatus 13 and the main body unit 12 varies according to the size and type of the main body unit 12 as in the examples illustrated in FIG. 16 and FIG. 17, the variation of the distance between them can be dealt with by the advancing and retreating movement of the switch portion 42 and the action of the first spring portion 46. In addition, since sound is produced by connection of the main body unit 12 to the extension apparatus 13, the user is prompted to correctly push the switch portion 42 into the housing 31, even when the distance between the extension apparatus 13 and the main body unit 12 varies as in the examples illustrated in FIG. 16 and FIG. 17. This structure causes the hook portions 41 to properly move to the engaged state S1, and prevents defective engagement of the hook portions 41 with the main body unit 12.

Next, operation performed when the hook portions 41 in the engaged state S1 are changed from the engaged state S1 to the disengaged state S2 will be explained hereinafter, with reference to FIG. 12 to FIG. 15. In the extension apparatus 13 of the present embodiment, it is necessary for the user to operate the operation lever 92 to release the engaged state S1 of the hook portions 41.

When the operation lever 92 is pulled from the state illustrated in FIG. 12 to the state illustrated in FIG. 13, the slider 101 slides in the left direction, by the actions of the cam groove 104 in the slider 101 of the release mechanism 91 and the pin 92B of the operation lever 92. Thereby, as illustrated in FIG. 13, the hook plate 62 moves in the back direction against the urging force of the third spring portions 63, by the actions of the cam holes 106 of the slider 101 and the third pins 75 of the hook plate 62. Together with this, the right hook 82 of the hook portion 41 moves in the left direction, and the left hook 83 moves in the right direction, by the actions of the second pins 74 of the hook plate 62 and the long holes 85. Thereby, the hook portions 41 move from the engaged state S1 to the disengaged state S2 (FIG. 14 and FIG. 15).

Simultaneously with movement of the hook portions 41 from the engaged state S1 to the disengaged state S2, the push-pins 94 move from a contained position Q1 to a projecting position Q2, by the action of the cam projections 107 of the slider 101. Specifically, by movement of the slider 101, each push-pin 94 changes from the state of abutting against the first abutting portion 107A of the cam projection 107 as illustrated in FIG. 14, to a state of abutting the inclined surface 107C, and then to the state of abutting against the second abutting portion 107B as illustrated in FIG. 15. By the action of pushing out the push-pins 94, the main body unit 12 is securely separated from the extension apparatus 13.

According to the present embodiment, the extension apparatus 13 comprises: the housing 31; the hook portion 41 movable between the engaged state S1 of being engaged with the main body unit 12 and the disengaged state S2 of being disengaged from the main body unit 12; the switch portion 42 capable of advancing and retreating with respect to the housing 31, and being pushed into the housing 31 when the main body unit 12 is attached; the mechanical portion 43 which moves the hook portion 41 between the engaged state S1 and the disengaged state S2, in response to pushing of the switch portion 42; the pin portion 45 provided inside the switch portion 42; the first spring portion 46 interposed between the housing 31 and the pin portion 45; the abutting portion provided in the mechanical portion 43, the abutting portion being movable in a direction crossing advancing and retreating directions of the switch portion 42 in connection with a pushing amount of the switch portion 42, abutting a distal end of the pin portion 45, and releasing abutment against the distal end of the pin portion 45 when the pushing amount of the switch portion 42 exceeds a predetermined amount; and the second spring portion 48 interposed between an internal surface of the switch portion 42 and the pin portion 45, the second spring portion 48 striking the distal end 45A of the pin portion 45 against a sound-producing portion 87 when abutment of the distal end 45A of the pin portion 45 against the abutting portion is released.

According to the above structure, when the pushing amount of the switch portion 42 exceeds the predetermined amount, it is possible to produce sound of colliding the pin portion 45 with the sound-producing portion 87, by the action of the second spring portion 48. By the sound, the user can recognize that the main body unit 12 has been correctly attached to the extension apparatus 13.

In addition, the second spring portion 48 has a repulsive force larger than a repulsive force of the first spring portion 46. According to this structure, the distal end 45A of the pin portion 45 can be struck against the sound-producing portion 87 with greater force, when abutment between the distal end 45A of the pin portion 45 and the abutting portion is released.

The mechanical portion 43 includes a preventing portion, and the preventing portion has a function of preventing the hook portions 41 from moving to the disengaged state S2. According to this structure, the preventing portion can restrict the movement of the hook portions 41, even when the user changes the position of the main body unit 12 during operation, or lifts up the main body unit 12. This structure reduces the risk that the extension apparatus 13 falls out of the main body unit 12 when the main body unit 12 is in an operated state.

The extension apparatus includes a release mechanism 91 which stops the function of the preventing portion and moves the hook portion 41 to the disengaged state S2. According to this structure, the release mechanism 91 is provided separately from the switch portion 42, and thereby the extension apparatus 13 can be properly detached from the main body unit 12 when the user desires.

The extension apparatus 13 includes a disabling portion which disables operation of the release mechanism. This structure further improves the security level, and reduces the risk that the main body unit 12 is stolen.

The extension apparatus 13 includes a projecting portion which projects from the housing 31 and separates the main body unit 12 from the housing 31, when the release mechanism 91 operates. According to this structure, the main body unit 12 is securely separated from the extension apparatus 13, when the hook portions 41 are changed to the disengaged state S2.

The extension apparatus 13 includes an operating portion to operate the release mechanism 91. According to this structure, the hook portions 41 are securely changed to the disengaged state when the user desires, by operating the operating portion.

The sound-producing portion 87 is part of the housing 31. This structure requires no special part serving as the sound-producing module 87, simplifies the structure, and achieves reduction in cost.

The main body unit 12 included in the extension system 11 is not limited to a portable computer as illustrated in the above embodiment, but may be another electronic apparatus, such as a mobile phone, a tablet apparatus, a portable information terminal such as a smartphone, and an electronic book reader which electronically displays books and images, as a matter of course.

The present invention is not limited to the above embodiment, but may be carried out with modified constituent elements within a range of not departing from the gist of the invention. Various inventions can be made by proper combinations of constituent elements disclosed in the above embodiment. For example, some constituent elements may be omitted from all the constituent elements disclosed in the embodiment. In addition, constituent elements of different embodiments may be used in combination.

What is claimed is:

1. An extension apparatus comprising:
a housing;
a hook portion movable between an engaged state of being engaged with a main body unit and a disengaged state of being disengaged from the main body unit;
a switch portion capable of advancing and retreating with respect to the housing, and being pushed into the housing when the main body unit is attached;
a mechanical portion which moves the hook portion between the engaged state and the disengaged state, in response to pushing of the switch portion;
a pin portion provided inside the switch portion;
a first spring portion interposed between the housing and the pin portion;
an abutting portion provided in the mechanical portion, the abutting portion being movable in a direction crossing advancing and retreating directions of the switch portion in connection with a pushing amount of the switch portion, abutting a distal end of the pin portion, and releasing abutment against the distal end of the pin portion when the pushing amount of the switch portion exceeds a predetermined amount; and
a second spring portion interposed between an internal surface of the switch portion and the pin portion, the second spring portion striking the distal end of the pin portion against a sound-producing portion when abutment of the distal end of the pin portion against the abutting portion is released.

2. The extension apparatus of claim 1, wherein
the second spring portion has a repulsive force larger than a repulsive force of the first spring portion.

3. The extension apparatus of claim 2, wherein
the mechanical portion includes a preventing portion, and the preventing portion has a function of preventing the hook portion from moving to the disengaged state.

4. The extension apparatus of claim 3, further comprising:
a release mechanism which stops the function of the preventing portion, and moves the hook portion to the disengaged state.

5. The extension apparatus of claim 4, further comprising:
a disabling portion which disables operation of the release mechanism.

6. The extension apparatus of claim 5, further comprising:
a projecting portion which projects from the housing and separates the main body unit from the housing, when the release mechanism operates.

7. The extension apparatus of claim 5, further comprising:
an operating portion to operate the release mechanism.

8. The extension apparatus of claim 1, wherein
the sound-producing portion is part of the housing.

9. An extension system comprising:
a main body unit; and
an extension apparatus connected to the main body unit;
wherein the extension apparatus includes:
a housing;
a hook portion movable between an engaged state of being engaged with the main body unit and a disengaged state of being disengaged from the main body unit;
a switch portion capable of advancing and retreating with respect to the housing;
a mechanical portion which moves the hook portion between the engaged state and the disengaged state in connection with the switch portion;
a pin portion provided inside the switch portion;
a first spring portion interposed between the housing and the pin portion;
an abutting portion provided in the mechanical portion, the abutting portion being movable in a direction crossing advancing and retreating directions of the switch portion in connection with the switch portion, abutting a distal end of the pin portion, and releasing abutment against the distal end of the pin portion when an operating amount of the switch portion exceeds a predetermined amount; and
a second spring portion interposed between an internal surface of the switch portion and the pin portion, the second spring portion urging the pin portion to strike the distal end of the pin portion against a sound-producing portion.

10. An extension apparatus comprising:
a housing;
a hook portion movable between an engaged state of being engaged with a main body unit and a disengaged state of being disengaged from the main body unit;
a switch portion capable of advancing and retreating with respect to the housing;
a mechanical portion which moves the hook portion between the engaged state and the disengaged state, in connection with the switch portion;
a pin portion provided inside the switch portion;
a first spring portion interposed between the housing and the pin portion;
an abutting portion provided in the mechanical portion, the abutting portion being movable in a direction crossing advancing and retreating directions of the switch portion in connection with the switch portion, abutting a distal end of the pin portion, and releasing abutment against the distal end of the pin portion when an operating amount of the switch portion exceeds a predetermined amount; and
a second spring portion interposed between an internal surface of the switch portion and the pin portion, the second spring portion urging the pin portion to strike the distal end of the pin portion against a sound-producing portion.

* * * * *